Figure 1:
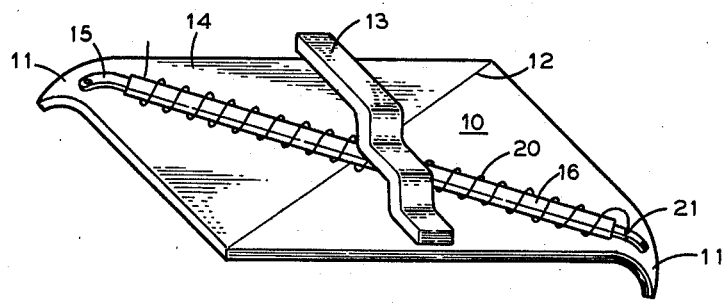

Nov. 26, 1963     J. W. WELSH     3,112,434

THERMOSTATIC VOLTAGE REGULATOR

Filed Jan. 7, 1960

INVENTOR.
James W. Welsh
BY
ATTORNEYS

United States Patent Office 3,112,434
Patented Nov. 26, 1963

3,112,434
THERMOSTATIC VOLTAGE REGULATOR
James W. Welsh, Summit, N.J., assignor to Signal-Stat Corporation, Brooklyn, N.Y., a corporation of New York
Filed Jan. 7, 1960, Ser. No. 1,011
7 Claims. (Cl. 322—28)

This invention relates to voltage regulators such as used in battery-generator electric supply systems and particularly in such supply systems for automotive vehicles. More particularly, the invention is directed to an improved and greatly simplified, as well as inexpensive, form of voltage regulator operating on thermostatic principles.

The electrical system of the usual automotive vehicle includes a generator and battery connected in parallel bucking relation and commonly feeding the electrical system of the vehicle. At certain times, as when the motor of the vehicle is idle, the battery supplies all of the current to the vehicle electrical system. At other times, when the vehicle engine or motor is operating at or above a pre-set speed, the generator supplies all of the vehicle electrical requirements and in addition feeds charging current to the battery to recharge the latter.

In order to properly control the connections of the generator and battery to prevent, on the one hand, burning out of the generator and, on the other hand, overcharging of the battery, a voltage regulator is connected between the battery and generator.

This voltage regulator performs several functions. In the first place, during the time when the generator output voltage is less than the voltage of the battery, the voltage regulator disconnects the generator from the battery. In the second place, when the generator voltage equals or exceeds the battery voltage, the voltage regulator connects the generator to the battery and to the vehicle electrical system. In the third place, when the battery is fully charged, the voltage regulator will cut back the charging rate of the generator to a value just sufficient to supply the electrical needs of the vehicle without feeding any current to the battery.

The voltage regulators presently used on automotive vehicles involve many problems in maintenance and adjustment, due to their massive construction and the relatively large number of make and break contacts involved. In addition, a unit efficiently accomplishing all of the foregoing functions is relatively expensive and thus adds considerably to the cost of the vehicle. There has thus existed, and still exists, an unfilled need for a voltage regulator which is simpler, less expensive, more reliable, and more compact than those presently used on automotive vehicles.

In accordance with the present invention, a voltage regulator for battery-generator electric supply systems is provided which has a bulk equivalent to that of the usual flasher utilized for automotive turn signalling systems, and which, nevertheless, is characterized by long life, ease of adjustment, ease of installation, and reliability in operation. Essentially, the voltage regulator comprises a snap action vane of circuit breaker such as shown in my U.S. Patent No. 2,712,044, issued June 28, 1955, the circuit breaker of said patent being modified in certain important respects to operate as a voltage regulator. Further, novel circuitry is used differing very substantially from that of the usual thermostatic flasher.

The voltage regulator of the invention includes a high resistance heating element which, upon starting up of the generator, requires a short length of time to become heated sufficiently to operate the snap action vane to close a circuit leading to the battery. Thus, the battery is not connected to the generator until such time as the generator output voltage equals or exceeds a pre-set value. The high resistance heating wire is so arranged that, when the battery is fully charged, the current from the generator flowing through the heating winding causes the winding to heat to a point where it will operate the vane to break the connection to the generator field. This prevents overcharging of the battery.

When the generator ceases to operate, the battery will tend to work the generator as an inefficient motor. To prevent this condition, the voltage regulator of the present invention includes a piece of thermostatically responsive metal, such as a bi-metal, secured to the snap action vane and arranged to open the battery contacts, when the battery tends to supply current to the generator.

Figure 2:
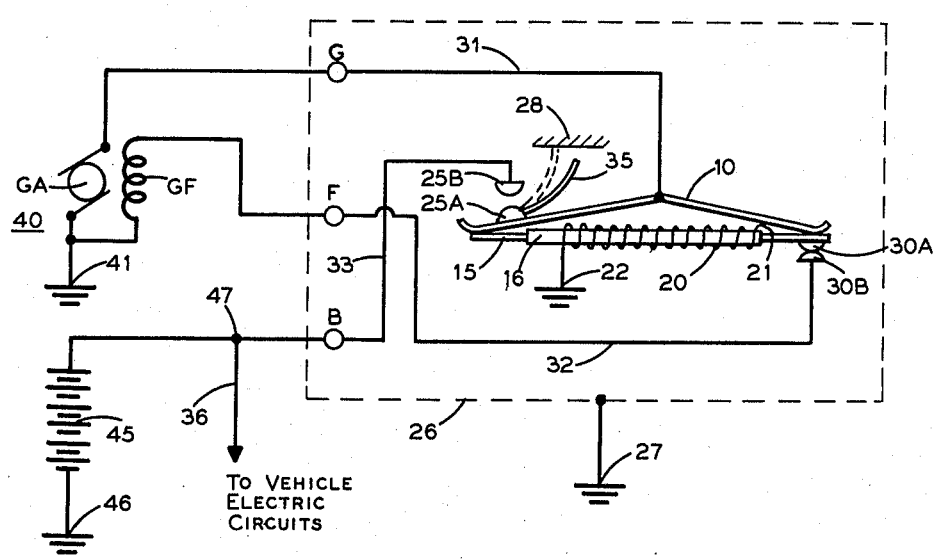

For an understanding of the invention principles, reference is made to the following description of a specific embodiment thereof as illustrated in the accompanying drawings. In the drawings:

FIG. 1 is a perspective view of a snap action type of vane as used in the voltage regulator of the invention; and FIG. 2 is a schematic wiring diagram illustrating the operation of the invention voltage regulator.

Referring to FIG. 1, the principal operating component of the voltage regulator comprises an electrically conductive metal snap action vane 10 as shown in FIG. 1. Vane 10 is of the general type disclosed and claimed in my U.S. Patent 2,756,304, issued July 24, 1956. As described in said Patent No. 2,756,304, if such a vane is provided with a pair of longitudinally spaced, relatively elongated deformations extending, for example, across or along one diagonal of the vane, the vane will assume an initially deformed condition in which it is bent into a V shape about such diagonal as the apex. By deforming said vane to a stress-deformed condition in which it is bent about the other diagonal and then attaching a heat expansible element to the vane as the ends of the first diagonal, the vane can be held in such stress-deformed condition by the expansible element. When the expansible element is heated in any manner, such as by flow of electric current therethrough, the element expands and after a predetermined expansion of the element the vane snaps back to its original deformed condition.

If such a vane is fixedly mounted upon a bracket or the like secured to the vane at a position to one side of such other diagonal so that the mounting point remains relatively fixed, during heating and cooling of the expansible element with resultant expansion and contraction thereof, the free portion of the vane, on the opposite side of such other diagonal, will have a relatively large amplitude of movement. Also, and due to the snapping of the vane, the expansible element will have a relatively large amplitude of movement toward and away from the surface of the vane. These factors may be used to advantage in incorporating the vane in a circuit breaker or flasher by mounting movable contacts on the expansible element, these movable contacts being, in the contracted condition of the expansible element, engaged with fixed contacts. Alternatively, the contacts could be so disposed that they are normally open and are closed only upon snapping of the vane as a result of expansion of the expansible element.

While the expansible element may be directly heated by flow of electric current therethrough, it may also be heated by a separate high resistance winding which is wrapped around and electrically insulated from the expansible element, such as described in my mentioned U.S. Patent 2,712,044. The vane 10 of FIG. 1 is generally of the type shown in FIGS. 1 and 7 of said U.S. Patent 2,712,044, being suitably modified in accordance with the use of which it is put in the present invention.

In FIG. 1, vane 10 has a heat expansible pull element or pull strip 15 secured thereto while the latter is stress-deformed about a diagonal indicated at 12. Strip 15 is spot welded or brazed at each end to corners 11, 11 of the vane. When element 15 is heated and expands, vane 10 eventually snaps from the stress-deformed condition in which it is bent about diagonal 12 to an initially deformed condition in which it is bent about the diagonal 11, 11 and, when vane 15 re-contracts, the vane 10 is snapped back to a position in which it is stress-deformed about diagonal 12.

In the illustrated embodiment, the vane may be supported on a bracket 13 which is secured to the vane at one side of diagonal 12, thus leaving an area 14 on the opposite side of such diagonal which has a relatively large amplitude of movement relative to fixed mounting bracket 13. Due to its attachment to vane 10, pull strip 15 is electrically connected thereto at each end. In accordance with the invention, a wrapping 16 of insulating material is placed around strip 15 and a high resistance heating winding 20 is wound around insulation 16. One end of winding 20 is electrically and mechanically connected to pull strip 15 adjacent an end thereof as indicated at 21.

Referring more to FIG. 2, a first movable contact 25A is mounted on vane 10 at a movable portion thereof and is normally disengaged from a relatively fixed contact 25B. Also, at a freely movable corner of the vane, a relatively movable contact 30A is mounted on the vane and is normally engaged with a relatively fixed contact 30B. For a purpose to be described, a bi-metallic strip 35 is secured to vane 10 immediately adjacent or even beneath contact 25A and has a free end movable between the solid and dotted line positions shown in FIG. 2.

The voltage regulator is enclosed within the usual metal casing indicated at 26 and grounded to the vehicle frame as at 27. A fixed portion 28 of casing 26, which may be a bracket or an abutment secured to the casing, is arranged to be engaged by bi-metallic strip 35 under certain conditions of operation. The voltage regulator is provided with three terminals G, F, and B. Terminal G is connected by a conductor 31 to vane 10. Terminal F is connected by a conductor 32 to fixed contact 30B. Terminal B is connected by a conductor 33 to fixed contact 25B.

In the usual manner, the vehicle is provided with a generator 40 arranged to deliver current to the vehicle electric circuits 36 conjointly with the usual vehicle battery 45. Generator 40 comprises an armature GA and a field GF. One terminal of each of the armature and field windings is common and is grounded as at 41. The other terminal of armature GA is connected to terminal G of the voltage regulator, and the ungrounded terminal of field winding GF is connected to terminal F of the voltage regulator. One terminal of battery 45 is grounded as at 46, and the other or ungrounded terminal thereof is connected to a junction point 47 for the vehicle electric circuits, junction point 47 being also connected to terminal B of the voltage regulator.

The voltage regulator operates in the following manner. In the position of the several parts as illustrated in FIG. 2, it may be assumed that the vehicle is stopped and the engine is shut off. In this condition, contacts 30A and 30B are engaged, but contacts 25A and 25B are disengaged to disconnect the battery from the generator, with the battery, however, feeding current to the vehicle electric circuits 36 upon demand. When the engine of the vehicle is started, generator 40 is also started. This induces a voltage at terminal G which causes a current to flow through conductor 31, vane 10, pull strip 15, joint 21, heating wire 20, and ground 22 connected to the opposite end of winding 20. Also, current will flow from vane 10 through strip 15, contacts 30A and 30B, conductor 32, terminal F, generator field GF, and to ground 41. The field of the generator will build up rapidly due to the residual magnetism of the generator. Also, the current flowing through heater wire 20 will cause the latter to be heated and thus cause pull strip 15 to expand somewhat so that the free portion of vane 10 will move outwardly. This will engage contact 25A with contact 25B. The spacing of contacts 25A and 25B is so selected that these contacts will be engaged only when the output voltage of generator 40 exceeds the normal voltage of battery 45. The current flowing through field GF is very low in value so that contacts 30A and 30B will last throughout the expected life of the unit. The foregoing conditions are maintained as long as the voltage of battery 45 is less than the output voltage of battery 40 as measured at junction point 47.

When the battery is fully charged so that its voltage equals or exceeds the output voltage of generator 40, the voltages at point 47 will be approximately equal and opposing so that there will be no current flow through contacts 25A and 25B. Under these conditions, all of the output voltage of the generator is utilized in effecting current flow through heater winding 20. This heater winding therefore becomes more highly heated and expands so that vane 10 snaps to a position disengaging contacts 30A and 30B. This breaks the field circuit of generator 40 so that the latter no longer delivers current to the battery. This condition is the adjustment for the fully charged condition of battery 45 and may be called the over voltage condition. Overcharging of the battery is thus prevented by opening of the contacts 30A and 30B to reduce very substantially the output of generator 40.

A third condition must be considered, and that is the condition wherein the vehicle is stopped and the engine is shut off. Under such conditions, of course, generator 40 is no longer driven and therefore has no output. The battery 45 would then tend to work the generator as an inefficient motor and the wires leading to the generator would become over-heated and possibly burned. In the present arrangement, such possibility is prevented by the bi-metallic strip 35.

The average charging rate is usually 35 to 40 amperes, and the current required for destruction of wires leading to the generator is usually above 60 amperes. With these factors in mind, the parameters of bi-metallic strip 35 are so selected that, when a current of 50 to 60 amperes flows from battery 45 through junction 47, terminal B, conductor 33, and contacts 25B and 25A into vane 10 connected to the generator armature, bi-metallic strip 35 will deflect to the dotted line position and will force open the contacts 25A and 25B. This interrupts the connection of battery 45 to generator 40. When contacts 25A and 25B open, the heating winding 20 will cool due to being disconnected from the battery which, with the generator idle, is the only source of power. As wire 25 cools, strip 15 contracts to snap vane 10 to a position in which contacts 25A and 25B are maintained open by the position of the vane 10. Bi-metallic strip 35 will then cool and return to its solid line position.

From the foregoing, it will be seen that a simple and efficient voltage regulator is provided in which all the conditions affecting the operation of the usual voltage regular are met in a simple manner. In addition, the unit is exertmely compact as compared to present voltage regulators, having a bulk of the order of that of the usual turn signal system flasher. Nevertheless, the unit assures the battery being disconnected from the generator when the latter is not operating, prevents overcharging of the battery, and assures proper build up of the generator field when the generator is operating.

While a specific embodiment of the invention has been shown and described in detail to illustrate the application of the invention principles, it will be understood that the invention may be embodied otherwise without departing from such principles.

What is claimed is:

1. A voltage regulator comprising, in combination, an electrically conductive metal snap action vane; a thermally expansible electrically conductive pull strip mechanically and electrically connected at its opposite ends to said vane and, in its contracted state, constraining said vane to a stress-deformed condition and said vane, upon expansion of said strip, snapping to a restored position; means fixedly supporting said vane at a point thereof whereby, during expansion and contraction of the pull strip, the free portion of the vane has a relatively large amplitude of movement relative to said support point; a first movable contact mounted on a free portion of said vane and normally engaged with a first fixed contact; a second movable contact mounted on a free portion of said vane and normally disengaged from a second fixed contact; a heating circuit for said strip including said strip and a ground connection; a first terminal connected to said vane; a second terminal connected to said first fixed contact; and a third terminal connected to said second fixed contact; whereby upon application to said first terminal of a first potential with respect to ground, current will flow from said first terminal through the said vane and first contacts to said second terminal, and through said vane and said heating circuit to ground; the movable portion of said vane, upon resultant expansion of said strip, engaging said second contact to connect said first terminal to said third terminal; the current flow through said heating circuit, when a second potential with respect to ground, applied to said third terminal, equals or exceeds the first potential applied to said first terminal, being increased to an extent where said strip expands to the point where the movable portion of said vane snaps said first contacts apart to open the circuit to said second terminal.

2. A voltage regulator comprising, in combination, an electrically conductive metal snap action vane; a thermally expansible electrically conductive pull strip mechanically and electrically connected at its opposite end to said vane and, in its contracted state, constraining said vane to a stress-deformed condition and said vane, upon expansion of said strip, snapping to a restored position; means fixedly supporting said vane at a point thereof whereby, during expansion and contraction of the pull strip, the free portion of the vane has a relatively large amplitude of movement relative to said support point; a first movable contact mounted on a free portion of said vane and normally engaged with a first fixed contact; a second movable contact mounted on a free portion of said vane and normally disengaged from a second fixed contact; a heating circuit for said strip including said strip and a ground connection; a first conductor electrically connected to said vane for electrical connection to the ungrounded terminal of a generator armature; a second conductor electrically connected to said first fixed contact for electrical connection to the ungrounded terminal of the generator field; a third conductor electrically connected to said second fixed contact for electrical connection to said junction; whereby, when said regulator is connected to a grounded battery-generator system, upon starting of the generator, current will flow from the armature through the said vane and first contacts to the generator field, and through said vane and said heating circuit to ground; the movable portion of said vane, upon resultant expansion of said strip, engaging said second contacts to connect said first terminal to said third terminal; the current flow through said heating circuit, when a second potential with respect to ground, applied to said third terminal, equals or exceeds the first potential applied to said first terminal being increased to an extent where said strip expands to the point where the movable portion of said vane snaps said first contacts apart to open the circuit to said second terminal; and thermo-responsive means connected to the movable portion of said vane and operable, upon flow of current through said second contacts above a pre-set value due to said first potential being removed from said first terminal while said second potential remains applied to said third terminal, to move such free portion to disengage said second contacts to disconnect the vane from said third terminal for cooling of said strip to snap said vane to a position holding said second contacts disengaged.

3. A voltage regulator as claimed in claim 1 in which said strip is heated sufficiently to effect movement of the movable portion of said vane to engage said second contacts only when said second potential is in excess of a predetermined normal value.

4. A voltage regulator as claimed in claim 1 wherein said heating circuit comprises a winding of high resistance wire around a layer of insulating material on said strip, one end of said winding being connected to said strip and the other end of said winding being connected to ground.

5. A voltage regulator as claimed in claim 2 wherein said thermo-responsive means comprises a strip of bimetal having one end secured to said vane adjacent said second movable contact and a free end projecting from said vane; said strip deflecting, upon such high heating of said second contacts, to engage a fixed abutment and move said vane free portion in a direction to separate said second contacts.

6. A voltage regulator as claimed in claim 2 in which said strip is heated sufficiently to effect movement of the movable portion of said vane to engage said second contacts only when said second potential is in excess of a predetermined normal value.

7 A voltage regulator as claimed in claim 2 wherein said heating circuit comprises a winding of high resistance wire around a layer of insulating material on said strip, one end of said winding being connected to said strip and the other end of said winding being connected to ground.

References Cited in the file of this patent

UNITED STATES PATENTS

| 1,777,963 | Doman | Oct. 7, 1930 |
| 2,244,307 | Menzel | June 3, 1941 |